United States Patent
Jin et al.

(10) Patent No.: US 6,661,895 B1
(45) Date of Patent: Dec. 9, 2003

(54) ZERO-DELAY STRUCTURE FOR SUB-BAND ECHO CANCELLATION

(75) Inventors: Qu Jin, Kanata (CA); Kon Max Wong, Dundas (CA); Qiang Wu, Covallis, OR (US); Philippe Wu, Nepean (CA); Gordon J. Reesor, Russell (CA)

(73) Assignee: Zarlink Semiconductor Inc. (CA)

( * ) Notice: Subject to any disclaimer, the term of this patent is extended or adjusted under 35 U.S.C. 154(b) by 0 days.

(21) Appl. No.: 09/414,413

(22) Filed: Oct. 7, 1999

(30) Foreign Application Priority Data

Oct. 7, 1998 (GB) .............................. 9821866

(51) Int. Cl.$^7$ ................................ H04M 9/08
(52) U.S. Cl. ........................ 379/406.14; 379/406.09; 379/406.13; 370/291
(58) Field of Search ............... 379/406.01, 406.02, 379/406.05, 406.08, 406.09, 406.14, 406.13; 370/286, 289, 290, 291

(56) References Cited

U.S. PATENT DOCUMENTS 5,329,587 A * 7/1994 Morgan et al. ............. 379/410
5,610,919 A * 3/1997 Willard et al. ............. 370/336
5,774,561 A * 6/1998 Nakagawa et al. ........... 381/66

FOREIGN PATENT DOCUMENTS

EP 0739102 10/1996 ............ H04B/3/21

OTHER PUBLICATIONS

INSPEC abstract of non–patent literature: "Delayless sub-band active noise control" by Thi et al in p. 181–4 vol. 1, IEEE, New York, NY, USA 1993, 5 volumes.
INSPEC abstract of Journal article: "Minimum mean-square error echo cancellation and equalization for digital subscriber line transmission. I. Theory and computation" by Lin, D.W. in IEEE Transactions on Communications vol. 38, No. 1 p. 31–8, Jan. 1990.

* cited by examiner

Primary Examiner—Binh Tieu
(74) Attorney, Agent, or Firm—Jones Day

(57) ABSTRACT

A zero-delay structure to be used in sub-band echo cancellation systems. In telecommunications, a delay is usually introduced in sub-band decomposition and/or sub-band reconstruction. This invention will help remove this. This structure not only removes the delay but does not sacrifice the performance of the echo canceller. It is to be used in combination with any sub-band-based echo canceller or wavelet echo canceller.

2 Claims, 2 Drawing Sheets

ZERO-DELAY STRUCTURE FOR SUB-BAND ECHO CANCELLATION

FIELD OF THE INVENTION

This invention relates in general to echo cancellation in telecommunications applications, and more particularly to a zero-delay topology for sub-band echo cancellation. A zero-delay structure, created from this topology, can be incorporated with any sub-band or wavelet echo canceller to ensure the removal of all delays incurred during daily telephone conversations (or telecommunication activities).

BACKGROUND OF THE INVENTION

An echo is the phenomenon in which a delayed and distorted version of an original signal is reflected back to the source. In general, echoes are caused by the reflection of signals from the boundaries of discontinuities in the transmission medium. In the transmission of telephone signals, an echo occurs whenever the transmitted signal encounters an impedance mismatch in the circuit. Such echoes cause impairment on the fidelity of the speech signals and are often detrimental to users.

Network echo cancellers are devices designed to remove these undesirable echoes in telephone transmission. The basic concept of an echo canceller is to synthesize a replica of the echo and to subtract it from the total received signal. An efficient algorithm to obtain the estimated echo path is the Least Mean Square (LMS) adaptive algorithm.

When the echo duration is long (400–500 ms), as in long distance phone calls or in hands- free telephones in a conference room, the number of taps in the adaptive algorithm increases proportionately, and the convergence rate of the adaptive filter slows down significantly. Even more seriously, it may not be able to remove the echoes sufficiently for a good quality speech signal. To overcome this difficulty, the sub-band filtering scheme, and, more recently, the wavelet decomposition scheme, have been proposed. Decomposition of the signal can reduce the computational complexity and can increase the adaptation speed by using the subsampled signals. With M sub-band decomposition, the adaptive filter length is reduced by a factor of M in each sub-band level. Sub-band decomposition is the process of down-sampling, the method of reducing or decimating a sample rate, and band splitting of a signal into several frequency bands. Also, because of the down-sampling procedure, the adaptive algorithm can be implemented at a rate which is M times slower than the original rate. As a result, the computational complexity is reduced, and the convergence rate is improved.

The basic structure for the sub-band echo canceller is shown in FIG. 1, where the signal decomposition and reconstruction could be implemented with either filter bank, any block transform, or wavelet decomposition. No matter what methods are used, the signal decomposition and reconstruction can always be equivalently expressed with a set of FIR (Finite Impulse Response) filter banks which satisfy the PR (Perfect Reconstruction) conditions. Both the echo signal and the reference signal will pass through a separate set of decomposition filter banks and then be down-sampled. The adaptive algorithm is operated at the sub-sample level with a reduced computational rate. Then the echo residual signals at different sub-bands will go through the reconstruction filter back to recover an echo-reduced far-end speech signal.

The problem with the sub-band echo canceller is that when the far-end signal goes trough the decomposition and the reconstruction filter banks, a delay is introduced. This delay can be minimized by the careful design of the PR filter banks, but cannot be totally eliminated. Also, in the filter bank design, when the delay is taken into consideration, the performance of the echo cancellation has to be sacrificed, because the minimum delay PR filter bank may not have the best performance for the echo cancellation.

The existence of delay in sub-band echo cancellation limits it applications. With speech transmission, it is always beneficial to the users if the delay introduced in the echo cancellation is zero, thus minimizing the end-to-end transmission delay of the speech.

It is an object of the present invention to provide a structure which will remove all delays from sub-band echo cancellation activities.

SUMMARY OF THE INVENTION

According to the present invention, a zero-delay structure has been developed such that the delay introduced in sub-band decomposition and reconstruction is eliminated without sacrificing echo cancellation performance. This structure can be used in combination with any sub-band-based echo canceller or wavelet echo canceller.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
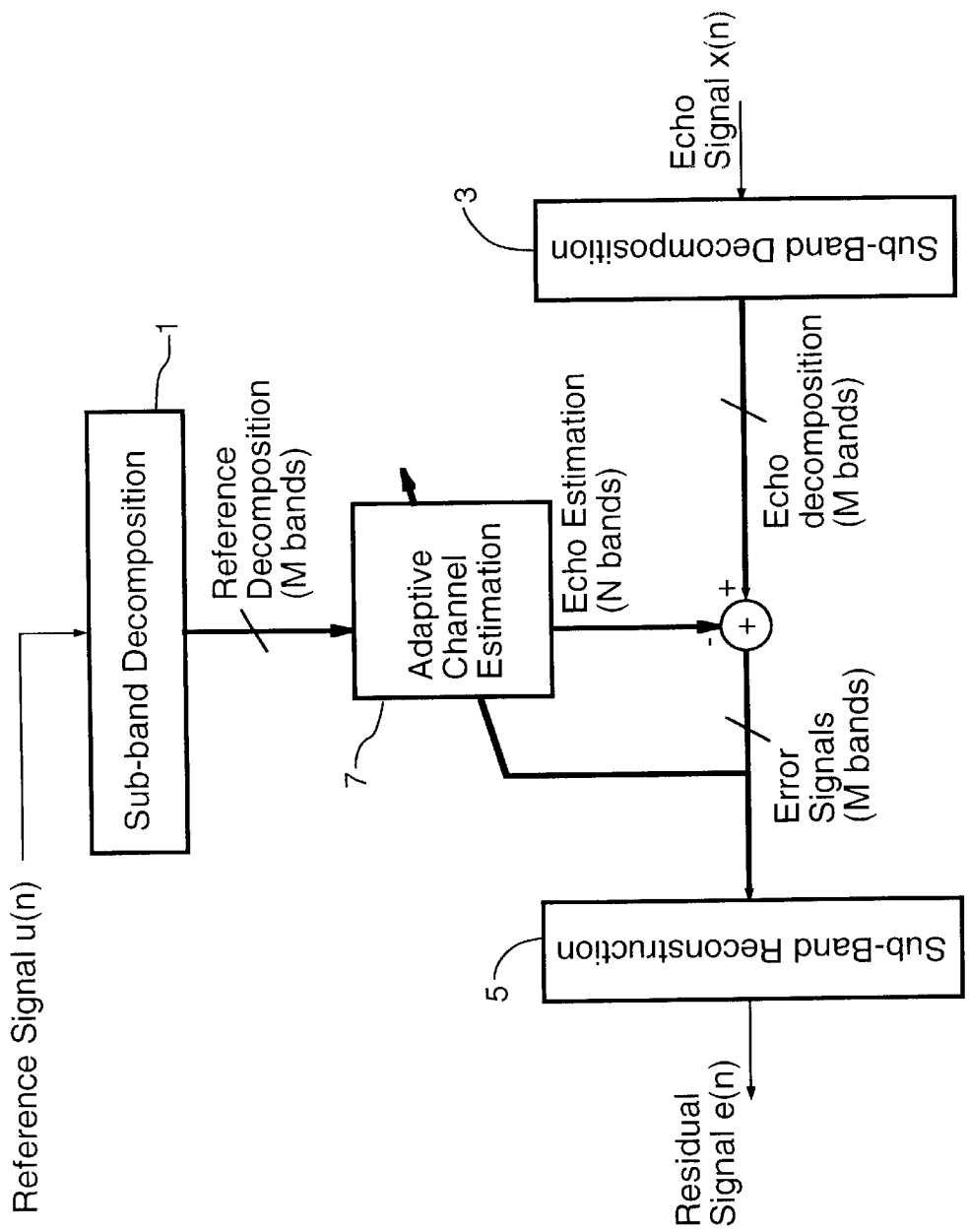
FIG. 1 is a schematic of a General Sub-band Echo Canceller.

FIG. 1 shows how a delay in a sub-band echo canceller is caused by sub-band decomposition and reconstruction, and how this delay is a fixed value dependent on a filter bank that is in use. Let the delay be equal to N sample points. After sub-band decomposition and subsequent down-sampling procedure, the delay contains less sampling points at the sub-band level. In each sub-band, the equivalent delay will approximately be N/M where M is the number of sub-bands.

Figure 2:
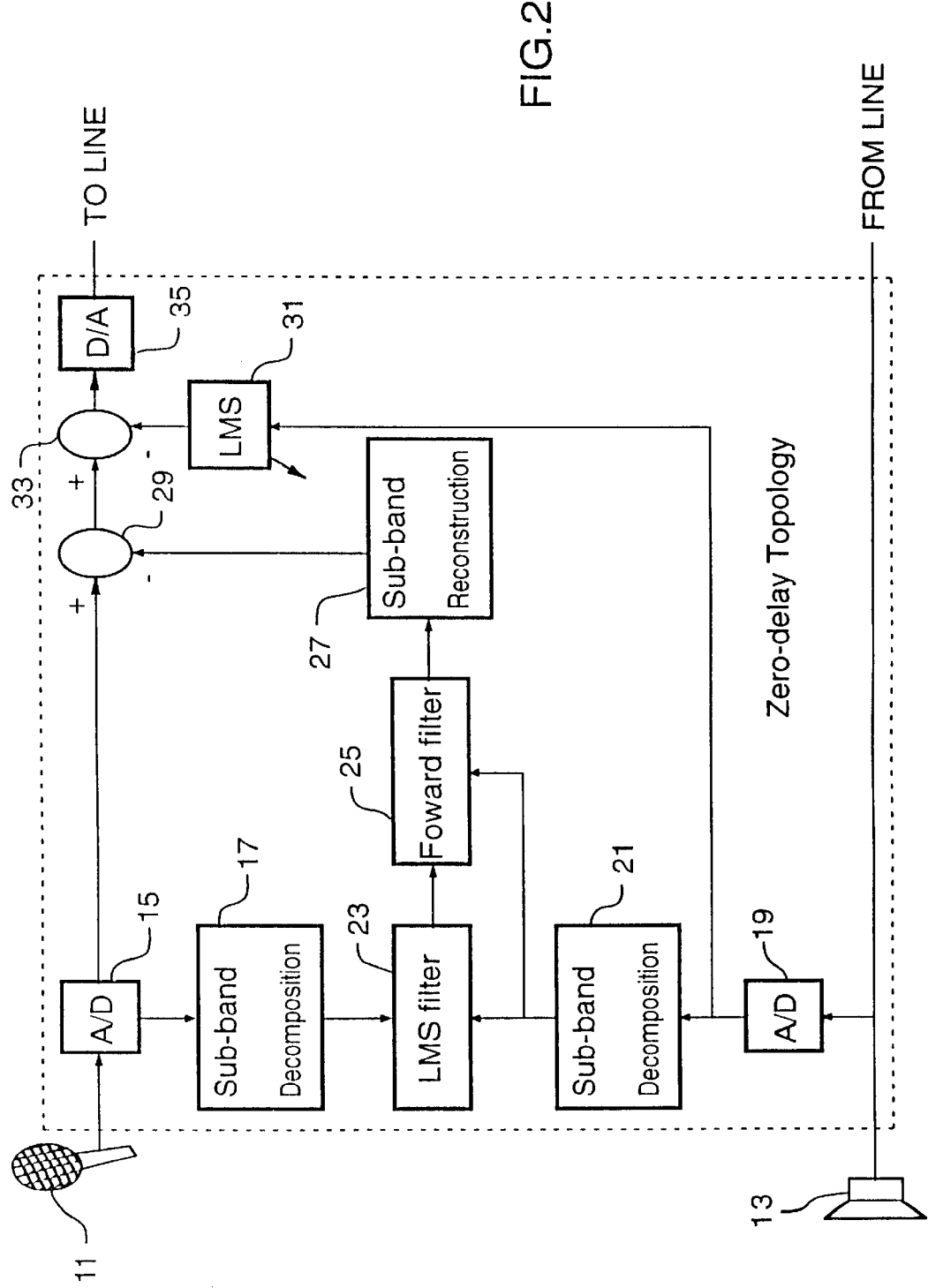
FIG. 2 is a schematic of a Zero-Delay Structure.

Suppose at the k-th sub-band, a LMS filter converges to $\{h_k(n)\}$, and convolution of a reference signal at the k-th sub-band with $\{h_k(n)\}$ gives out an echo replica at the sub-band with N/M samples delay. The zero-delay echo replica can be obtained by convolving the reference signal with $\{h_k(n+N/M)\}$. The above procedure tells us that the delay can be compensated by pre-forwarding the filter $\{h_k(n)\}$, with N/M samples. However, for a general causal filter $\{h_k(n)\}$, $\{h_k(n+N/M)\}$ will be an unrealizable non-causal filter. The zero-delay sub-band echo canceller is shown in FIG. 2, in which a forward-filter block presents a causal part of the forward filter; i.e.

$$h_k^f(n) = \begin{cases} h_k(n + N/M), & n \geq 0 \\ 0, & \text{otherwise} \end{cases}$$

Note: the forward filter, in comparison with the output of the original filter, outputs earlier in time.

With the reference signal being convolved with the causal forward-filter at each sub-band level, the output of the filter-bank reconstruction yields the echo replica without delay. However, in $\{h_k^f(N)\}$, the first N/M coefficients of {$h_k(n)$} are missed. Equivalently, the first N coefficients in the original echo path are lost. These coefficients can be compensated with the LMS filter outside the sub-band reconstruction. Sub-band reconstruction is the process of up-sampling, the process of increasing a sample's rate of a signal by zero insertion and anti-image filtering, and re-combining the sub-band signal to re-generate the original signal. The general requirement of decomposition and reconstruction is that the original signal should be re-generated after the re-construction procedure without distortion or degradation.

In FIG. 2, the zero-delay topology is shown. The input signal are entered either through a microphone and/or a speaker. The signal(s) is(are) then sub-band decomposed and down-sampled before being passed to an LMS filter. The LMS filter along with the forward filter combines to make up an adaptive filter, the result of which produces an estimated zero-delay echo. The estimated zero-delay echo is then reconstructed and subtracted from the input signal. An external LMS filter is added to cancel the remaining echo cause by the first N coefficients in the echo path. The result of which is sent through an D/A converter and outputted to the other end. For the incoming speech signal, no delay is involved. Considering the length of the filters in both the sub-band decomposition and the sub-band reconstruction, it is suggested that the external LMS filter be assigned a few more than N weights for better performance.

We claim:

1. A zero-delay structure for eliminating delays incurred during sub-band echo-cancellation, comprising:

first sub-band decomposition means to band split and down sample a digital echo signal into several frequency bands, second sub-band decomposition means to band split and down sample a digital reference signal into several frequency bands, a first Least Mean Square (LMS) filter to receive the decomposed digital reference signal and the decomposed digital echo signal and in response generate an LMS signal representing the estimated echo paths thereof, a forward filter to receive and output the decomposed digital reference signal and the LMS signal earlier in time thereby eliminating said delays incurred during sub-band echo-cancellation other than delay due to an initial portion of said echo path, sub-band reconstruction means to up sample and re-combine the signal output from said forward filter thereby regenerating said digital signals with only said delay due to the initial portion of said echo path, a further Least Mean Square (LMS) filter to eliminate said delay due to the initial portion of said echo path, and additive and subtractive means to subtract said reconstructed signal with no delay from said digital echo signal.

2. An echo canceller, comprising:

A/D (analog—digital) and D/A (digital—analog) converters;

adaptive channel estimation means; and a zero-delay structure for eliminating delays incurred during sub-band echo cancellation, wherein said zero delay structure comprises first sub-band decomposition means to band split and down sample a digital echo signal into several frequency bands, second sub-band decomposition means to band split and down sample a digital reference signal into several frequency bands, a first Least Mean Square (LMS) filter to receive the decomposed digital reference signal and the decomposed digital echo signal and in response generate a LMS signal representing the estimated echo paths thereof, a forward filter to receive and output the decomposed digital reference signal and the LMS signal earlier in time thereby eliminating said delays incurred during sub-band echo-cancellation other than delay due to an initial portion of said echo path, sub-band reconstruction means to up sample and re-combine the signal output from said forward filter, thereby regenerating said digital signals with only said delay due to the HA, initial portion of said echo path, a further Least Mean Square (LMS) filter to eliminate said delay due to the initial portion of said echo path, and adaptive and subtractive means to subtract said reconstructed signal with no delay from said digital echo signal.

* * * * *

UNITED STATES PATENT AND TRADEMARK OFFICE
CERTIFICATE OF CORRECTION

PATENT NO.     : 6,661,895 B1
DATED          : December 9, 2003
INVENTOR(S)    : Jin et al.

It is certified that error appears in the above-identified patent and that said Letters Patent is hereby corrected as shown below:

<u>Column 4,</u>
Line 37, delete "HA"

Signed and Sealed this

Eighth Day of June, 2004

JON W. DUDAS
*Acting Director of the United States Patent and Trademark Office*